(12) United States Patent
Anderson

(10) Patent No.: US 8,734,618 B2
(45) Date of Patent: May 27, 2014

(54) APPARATUS

(75) Inventor: George Anderson, Amsterdam (NL)

(73) Assignee: Shell Oil Company, Houston, TX (US)

( * ) Notice: Subject to any disclaimer, the term of this patent is extended or adjusted under 35 U.S.C. 154(b) by 728 days.

(21) Appl. No.: 12/630,941

(22) Filed: Dec. 4, 2009

(65) Prior Publication Data

US 2010/0180633 A1 Jul. 22, 2010

(30) Foreign Application Priority Data

Dec. 8, 2008 (EP) .................................... 08170914

(51) Int. Cl.
*B01D 3/00* (2006.01)
*F28D 7/02* (2006.01)

(52) U.S. Cl.
USPC ............. 203/98; 165/138; 165/157; 165/162; 165/163; 165/184; 202/176; 202/182; 202/185.1; 202/189; 203/DIG. 16; 208/108; 208/113; 208/184; 585/800

(58) Field of Classification Search
USPC ................ 165/138, 157, 162, 163, 184, 201; 202/176, 182, 185.1, 189; 203/98, 203/DIG. 16; 208/108, 113, 184; 585/800
See application file for complete search history.

(56) References Cited

U.S. PATENT DOCUMENTS

| | | | | |
|---|---|---|---|---|
| 3,886,049 A * | 5/1975 | Bir et al. | ............................ | 203/9 |
| 4,175,034 A | 11/1979 | Thompson | .................... | 208/321 |
| 4,266,958 A * | 5/1981 | Cummings | ...................... | 62/633 |
| 4,436,146 A * | 3/1984 | Smolarek | ...................... | 165/111 |
| 4,484,986 A | 11/1984 | Bannon | ............................ | 203/42 |
| 4,502,877 A * | 3/1985 | Bacon, Sr. | ...................... | 202/158 |
| 4,526,656 A * | 7/1985 | Okada et al. | ................... | 202/158 |
| 4,697,321 A | 10/1987 | Shibuya et al. | ............... | 29/157.3 |
| 5,141,536 A * | 8/1992 | Schievelbein et al. | ........... | 96/242 |
| 5,507,356 A * | 4/1996 | Roth et al. | ...................... | 165/111 |
| 5,671,807 A * | 9/1997 | Lameris | ....................... | 165/134.1 |
| 5,699,671 A * | 12/1997 | Lockett et al. | ...................... | 62/63 |
| 6,393,866 B1 * | 5/2002 | Srinivasan et al. | .............. | 62/643 |
| 6,635,148 B1 * | 10/2003 | Nishimura et al. | ............ | 202/153 |
| 7,413,634 B1 * | 8/2008 | Napier | ........................... | 202/153 |
| 7,588,666 B2 * | 9/2009 | Saifutdinov et al. | .............. | 203/1 |
| 2003/0221818 A1 | 12/2003 | Gentry et al. | .................. | 165/159 |
| 2005/0121303 A1 * | 6/2005 | de Graauw et al. | ............... | 203/2 |
| 2007/0180855 A1 | 8/2007 | Butts | ................................ | 62/620 |
| 2007/0267171 A1 * | 11/2007 | Herwig et al. | ................... | 165/61 |
| 2008/0149316 A1 * | 6/2008 | Friese et al. | .................... | 165/163 |
| 2010/0282450 A1 * | 11/2010 | Mulder | ........................... | 165/159 |

FOREIGN PATENT DOCUMENTS

| | | | | |
|---|---|---|---|---|
| GB | 908123 | 1/1959 | | |
| WO | WO03013694 | 2/2003 | ............. | B10D 45/12 |
| WO | 03067170 | * 8/2003 | | |
| WO | WO03067170 | 8/2003 | .............. | F28F 9/013 |

* cited by examiner

*Primary Examiner* — Virginia Manoharan

(57) ABSTRACT

Apparatus for treating a gaseous hydrocarbon fraction to obtain a gaseous fraction and a liquid fraction which apparatus includes a shell-and-tube heat exchanger and a distillation column, wherein the shell-and-tube heat exchanger includes an inlet and an outlet for cooling fluid which inlet and outlet are in fluid communication with the tube side of the heat exchanger, and an inlet for the gaseous hydrocarbon fraction at the upper end of the heat exchanger which inlet is in fluid communication with the shell side of the heat exchanger, and a conduit for guiding hydrocarbons from the heat exchanger to the distillation column which distillation column includes an outlet for gas at its upper end and an outlet for liquid at its lower end, and process in which such apparatus is used.

10 Claims, 1 Drawing Sheet

APPARATUS

This application claims the benefit of European Application No. 08170914.9 filed Dec. 8, 2008 which is incorporated herein by reference.

The present invention relates to an apparatus for treating a gaseous hydrocarbon fraction to obtain a gaseous and a liquid fraction and to a process for use of such apparatus.

It is well known to separate hydrocarbons such as crude oils and condensates with the help of distillation into several fractions on basis of different boiling points. Distillation comprises heating the hydrocarbons to be separated and sending the hot vapour/liquid mixture to a fractionating column which it enters in the form of a mist. The vapour passes upwards and the liquid passes downwards. In the so-called rectifying section, condensation and re-evaporation take place. The most volatile components, gas and gasoline, are removed from the top of the column as a gaseous fraction. This gaseous hydrocarbon fraction is usually cooled in a heat exchanger with the help of water to condense the gasoline vapour while the uncondensable gaseous hydrocarbons remain in the vapour phase. The mixture is sent to a vessel to separate the vapour phase from the condensate. Part of the condensate, called the reflux, is sent back to the upper part of the distillation column to maintain a downward stream of liquid and to control the temperature at the top by varying the amount returned. The remaining part of the condensate is removed from the process as a liquid fraction. The uncondensable gaseous hydrocarbons are removed as gases. This process has been described on page 83 of "The Petroleum Handbook", fifth edition (1966) as published by Shell International Petroleum Company Limited.

US-A-2007/0180855 describes a downflow, knockback condenser for removing nitrogen from natural gas in which the gas to be cooled flows through the tubes of a heat exchanger. This set-up causes a pressure-drop and would be prone to fouling if applied with hot hydrocarbon streams such as cracking product.

It has now been found that by integrating the heat exchanger and the distillation column according to the present invention, the pressure drop over these combined units can be further reduced. Such set-up can be especially advantageous in debottlenecking when there is a given pressure difference while a higher throughput is desired. A further advantage of the set-up according to this invention is that the condenser is less prone to fouling. Another advantage of the present invention is that it requires less piping and equipment. The present invention further has the advantage that less plot space is needed and the integrated apparatus is easy to operate.

The present invention relates to an apparatus for treating a gaseous hydrocarbon fraction to obtain a gaseous fraction and a liquid fraction which apparatus comprises a shell-and-tube heat exchanger, a distillation column and a conduit for guiding hydrocarbons from the heat exchanger to the distillation column, wherein the shell-and-tube heat exchanger comprises an inlet and an outlet for cooling fluid which inlet and outlet are in fluid communication with the tube side of the heat exchanger, and an inlet for the gaseous hydrocarbon fraction at the upper end of the heat exchanger which inlet is in fluid communication with the shell side of the heat exchanger, and the heat exchanger further comprises the inlet of the conduit for guiding hydrocarbons from the shell side of the heat exchanger to the distillation column, and the distillation column comprises the outlet of the conduit for guiding hydrocarbons from the heat exchanger to the distillation column and further an outlet for gas at the upper end of the distillation column and an outlet for liquid at the lower end of the distillation column.

Figure 1:
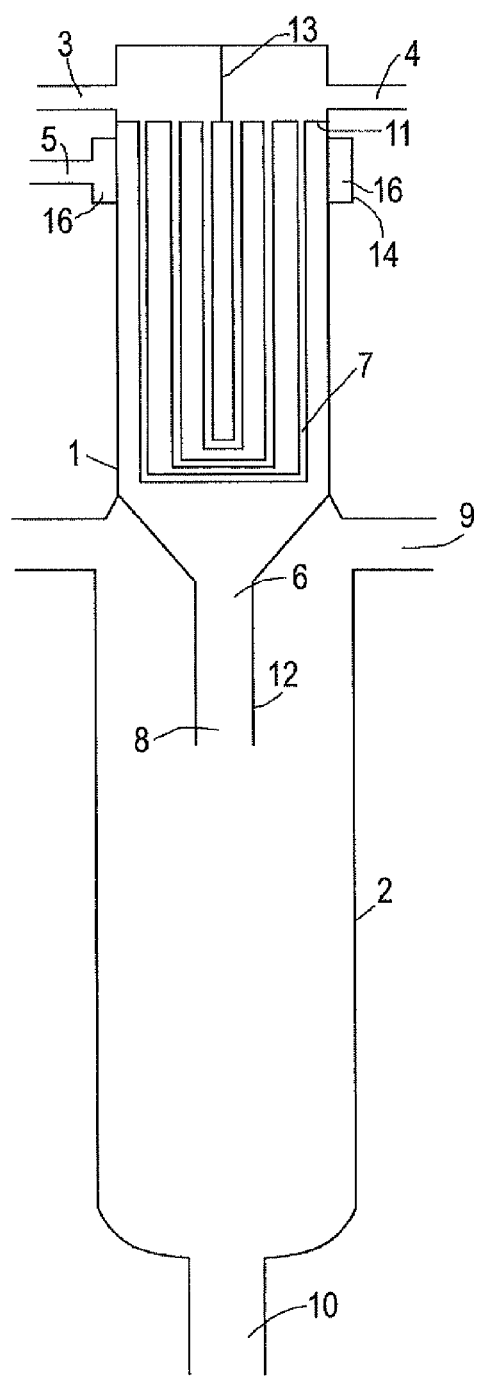
FIG. 1 shows a cross section of the plane through the longitudinal axis of an embodiment of the inventive heat exchanger.

In the description of the present invention, the expressions "an outlet" and "an inlet" mean that one or more of these outlets or inlets can be present. Several outlets or inlets can be advantageous in case there is a relatively large amount of gas and/or liquid. It can be especially advantageous for the distillation column to comprise more than one outlet for liquid if liquids of different density are present, for example water and a hydrocarbon mixture. In such case, the outlets can be positioned at the appropriate height making it possible to remove the different liquids separately. In the case of water and a hydrocarbon mixture, the outlet for the hydrocarbon mixture would be at the side of the distillation column while the outlet for water could be at the bottom of the distillation column.

The majority of the gaseous hydrocarbon fraction to be treated according to the present invention, will be in the gas phase. However, this gaseous fraction can further contain a limited amount of liquid. The amount of liquid generally will be less than 10% by weight, more specifically less than 5% by weight, more specifically at most 1% by weight, most specifically at most 0.5% by weight.

The gaseous hydrocarbon fraction can contain compounds other than hydrocarbons, specifically water. The amount of compounds other than hydrocarbons generally will be less than 10% by weight, more specifically less than 5% by weight. It will be clear that if compounds other than hydrocarbons are present in the gaseous fraction, these compounds also are present in the hydrocarbons present in the heat exchanger and the distillation column.

The present invention further relates to a process for cooling and separating a gaseous hydrocarbon fraction, which process comprises the use of an apparatus according to the present invention in which process a gaseous hydrocarbon fraction is introduced into the heat exchanger, cooling fluid flows through the tubes of the heat exchanger, hydrocarbons flow from the heat exchanger to the distillation column via the conduit for guiding hydrocarbons from the heat exchanger to the distillation column, a gaseous fraction is removed from the distillation column via the outlet for gas, and a liquid fraction is removed from the distillation column via the outlet for liquid.

In relation with the present invention, the expression cooling is used to indicate a reduction in temperature and/or condensation.

As mentioned above, the integration according to the present invention reduces the pressure drop over the combination of a cooling and a separation unit. It will be clear that the set-up according to the present invention also requires less piping and equipment than a conventional set-up containing separate units. According to the present invention, cooling is carried out within a single apparatus. This makes that the maximum amount of heat is recovered thereby increasing the possibility of using the recovered heat elsewhere in the refinery.

The expressions "lower" and "upper" as used in relation with the present invention, refer to the position of the apparatus during normal operation.

The apparatus according to the present invention comprises a shell-and-tube heat exchanger. A shell-and-tube heat exchanger is an indirect heat exchanger in which heat is transferred between a fluid passing through tubes and a fluid passing through the space outside the tubes. The space inside the tubes is referred to as the tube side in relation with the present invention, while the space outside the tubes is referred to as the shell side. Details of shell-and-tube heat exchangers can for example be found in Perry's Chemical Engineers' Handbook, 5th edition, 1973, McGraw-Hill Inc., page 11-3 to 11-21. Generally, a shell-and-tube heat exchanger comprises a distillation column internally provided with a tube bundle comprising a plurality of parallel tubes that extend in the longitudinal direction of the distillation column, wherein the tube bundle further comprises axially spaced apart transverse supports for supporting the tubes in the distillation column. The distillation column most often is cylindrical.

The tube bundle is the most important part of the shell-and-tube heat exchanger. The ends of the tubes are secured to a so-called tube sheet. A heat exchanger can include two tube sheets, one at each end of the cylindrical distillation column, or a single tube sheet at one end of the cylindrical distillation column in the event the heat exchanger is a U-tube heat exchanger. In the intermediate portions of the tubes, supports generally are present to prevent damage to the tubes due to vibrations caused by the fluid flow.

An aim of the present invention is to reduce the pressure drop over the combination of heat exchanger and separator. The pressure drop over the heat exchanger can be reduced further by ensuring mainly longitudinal flow in the heat exchanger. Several means are known for enhancing longitudinal flow in a heat exchanger. Examples of specific means are twisted tubes and support baffles ensuring longitudinal flow. Support baffles support the tubes as well as direct the fluid flow on the shell side. These baffles are important for the heat-transfer characteristics of a heat exchanger. Baffles which are especially suitable for enhancing longitudinal flow, are rod baffles, helix baffles and expanded metal baffles. Therefore, the heat exchanger for use in the present invention preferably comprises tubes selected from the group consisting of twisted tubes and tubes supported by rod baffles, helix baffles and/or expanded metal baffles.

Rod baffles are transverse support baffles having rods extending through the lanes between rows of tubes. A baffle set can consist of a baffle with rods in all vertical lanes and another baffle with rods in all horizontal lanes between the tubes perpendicular to the longitudinal axis of the tubes. Rod baffles create on the shell side a uniform flow parallel to the tubes.

Helix baffles are baffles having the shape of a helix. They can consist of one or more layers of helical baffles. Such baffles are commercially available. Further information on helix baffles can be found in U.S. Pat. No. 4,697,321.

Expanded metal baffles are transverse supports for supporting tubes in a heat exchanger which are made of a sheet of expanded metal. A sheet of expanded metal is made from sheet metal that is slit and stretched into a structure of cross laths with interstices. The size of the interstices can be so selected that it is about equal to the diameter of the tube, so that the tube is supported in the transverse directions by a single transverse support. Alternatively, the size of the interstices can be larger than the diameter of the tube so that a transverse support supports the tube in one or two transverse directions. In this case, two or more transverse supports displaced relative to each other will be needed to support a tube in all transverse directions. Expanded metal baffles have the advantage that longitudinal flow has minimum restrictions while the tilting of the strands and bonds induces local cross-flow. Expanded metal baffles have been described in EP-A-1472500.

In view of their specific properties, it is preferred to apply in the present invention a heat exchanger comprising tubes supported by expanded metal baffles.

The cooling fluid for use in the present invention can in principle be any fluid. In most cases, hydrocarbons or water will be preferred. Generally, water is most preferred. The cooling fluid will generally flow into the tubes of the heat exchanger via a tube sheet which is a plate which is closed except for the openings of the tubes of the heat exchanger. It is further preferred that the heat exchanger comprises at least one separator plate perpendicular to the tube sheet which separates the inlet from the outlet for cooling fluid. More than 1 separator plate will be present if the cooling fluid is to pass through more than 1 sets of tubes.

The heat exchanger comprises an inlet for the gaseous hydrocarbon fraction. It is preferred that the gaseous hydrocarbon fraction is evenly distributed over the cross-section of the heat exchanger in order to make full use of the heat exchange capacity. An even distribution can be attained by using several inlets for introduction of the gaseous hydrocarbon fraction such as 3 or more inlets. A preferred method of ensuring an even distribution is by using an inlet which is in fluid communication with an annular distributor which again is in fluid communication with the shell side of the heat exchanger. Such annular distributor preferably is a hollow ring around the heat exchanger wherein the outer surface of the distributor is parallel to the longitudinal axis of the heat exchanger tubes and which hollow ring comprises one or more inlet openings which are in fluid communication with the inlet for introduction of the gaseous hydrocarbon fraction into the heat exchanger and comprises outlet openings which are in fluid communication with the shell side of the heat exchanger. As the ring is hollow, it comprises an annular chamber through which fluid can flow. The annular distributor preferably comprises a single inlet.

The gaseous hydrocarbon fraction to be treated in the apparatus according to the present invention can in principle be any fraction. Specific gaseous fractions which can be treated with the help of the present invention are gaseous fractions obtained in a catalytic cracking unit, in a hydrocracking unit or obtained by distillation at normal or reduced pressure. A fraction for use in the present invention will generally be such that at least 95% by weight of the hydrocarbons boil at normal pressure below 300° C., more specifically below 250° C., most specifically below 200° C. The precise boiling range of the gaseous hydrocarbon fraction depends on the process by which the gaseous fraction has been obtained.

Upon entering the heat exchanger, the gaseous fraction generally has a temperature of from 125 to 250° C. After having been treated in the heat exchanger in accordance with the present invention, the cooled hydrocarbon fraction generally has a temperature of from 100 to 150° C.

The apparatus according to the present invention can be applied at elevated, atmospheric and reduced pressure.

After having been cooled in the heat exchanger, the hydrocarbons are sent to a distillation column for separating gaseous hydrocarbons from liquid hydrocarbons. The only fluid connection between the heat exchanger and the distillation column will generally be the conduit for guiding hydrocarbons from the exchanger to the distillation column to ensure that gaseous compounds cannot flow back into the heat exchanger. At the upper end, the distillation column comprises one or more outlets for gas. The gas which has been removed can be sold, stored, treated further or used in any other way known to someone skilled.

The lower end of the distillation column comprises an outlet for liquid. This outlet can contain a vortex breaker in order to prevent gas becoming entrained in the liquid.

The invention will now be described by way of example in more detail with reference to the accompanying drawings, wherein FIGS. 1 and 2 disclose different cross sections of the same embodiment of the present invention.

Figure 2:
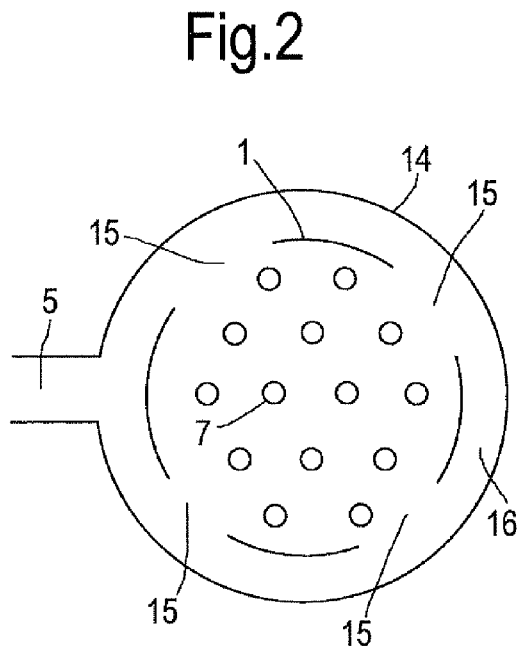
FIG. 2 shows a cross section perpendicular to the longitudinal axis of the heat exchanger.

FIG. 1 shows a cross section of the plane through the longitudinal axis of the embodiment in question, while FIG. 2 discloses a cross section perpendicular to the longitudinal axis of the embodiment in question at the height where the heat exchanger is surrounded by an annular distributor. Where the same reference numerals are used in FIGS. 1 and 2, they refer to the same or similar objects.

The embodiment shown in FIG. 1 comprises a cylindrical shell-and-tube heat exchanger 1 and a distillation column 2. Various shell-and-tube heat exchangers can be used and someone skilled in the art will know which heat exchanger to use for which specific set of conditions. The heat exchanger has an inlet for cooling fluid 3 and an outlet for cooling fluid 4. The inlet 3 and outlet 4 are separated by separator plate 13 which ensures that there is no exchange of cooling fluid between the inlet 3 and outlet 4 other than via the heat exchanger tubes 7. The inlets and outlets of heat exchanger tubes 7 form part of tube sheet 11. The heat exchanger further comprises at its upper end an inlet 5 for introducing gaseous hydrocarbon fraction into the shell side of the heat exchanger. The gaseous fraction is introduced at the upper end of the heat exchanger which makes that it passes the heat exchanger only once. This causes less pressure drop than an operation in which the fraction passes through the heat exchanger twice or more. In the embodiment of FIG. 1, inlet 5 is in fluid communication with annular distributor 14. The annular distributor 14 is a hollow ring around the heat exchanger comprising a single inlet opening which is in fluid communication with inlet 5. Annular distributor 14 comprises annular chamber 16 which has outlet openings which are in fluid communication with the shell side of the heat exchanger 1. The form of these outlet openings is not shown in FIGS. 1 and 2 but these openings generally are slits or rectangular openings which preferably have their longitudinal axis parallel to the longitudinal axis of the heat exchanger tubes.

It is preferred that the inlet 3 and outlet 4 of the cooling fluid are upstream of the inlet 5 for introducing the gaseous fraction. The heat exchanger 1 further comprises the inlet 6 of conduit 12 for guiding hydrocarbons from the shell side of the heat exchanger 1 to the distillation column 2.

The outlet 8 of conduit 12 opens into distillation column 2. It is preferred that conduit 12 extends to of from 10 to 80% of the height of the distillation column, said height running from the inlet of the conduit to the bottom of the distillation column or the place where such bottom would have been if there is a liquid outlet at the bottom of the distillation column. Preferably, the conduit extends to of from 25 to 75%, more preferably of from 30 to 70% of the height of the distillation column.

The distillation column 2 further comprises one or more outlets for gas 9 at the upper end of the distillation column. It will be clear to someone skilled in the art that there should be sufficient distance between outlet 8 and outlet 9 in order to prevent liquid becoming entrained. Preferably, gas outlets 9 are close to the upper end of the distillation column 2, more specifically at from 5 to 30% of the height of the distillation column as defined above. Distillation column 2 further comprises a liquid outlet 10.

FIG. 2 discloses a cross section perpendicular to the intersection shown in FIG. 1 at the height of the annular distributor. The annular distributor 14 is a hollow ring which comprises an annular chamber 16 through which fluid can flow. The wall of annular chamber 16 which is adjacent to the heat exchanger 1 contains outlet openings 15 which are in fluid communication with the shell side of the heat exchanger 1.

The distribution of tubes 7 over the cross section of heat exchanger 1 depends on the specific circumstances such as the baffles used for supporting the tubes and the heat exchange to be attained.

What is claimed is:

1. Apparatus for treating a gaseous hydrocarbon fraction to obtain a gaseous fraction and a liquid fraction which apparatus comprises a shell-and-tube heat exchanger, a distillation column and a conduit for guiding hydrocarbons from the heat exchanger to the distillation column, wherein
   the shell-and-tube heat exchanger comprises an inlet and an outlet for cooling fluid which inlet and outlet are in fluid communication with the tube side of the heat exchanger, and an inlet for the gaseous hydrocarbon fraction at the upper end of the heat exchanger which inlet is in fluid communication with the shell side of the heat exchanger, said inlet and outlet for the cooling fluid being located upstream of said inlet for the gaseous hydrocarbon fraction,
   the distillation column comprises an outlet for gas at the upper end of the distillation column and an outlet for liquid at the lower end of the distillation column, and
   the conduit for guiding hydrocarbons comprises an inlet for guiding hydrocarbons from the shell side of said heat exchanger and an outlet for guiding hydrocarbons to said distillation column.

2. Apparatus according to claim 1, in which the tubes of the shell-and-tube heat exchanger are selected from the group consisting of twisted tubes, tubes supported by rod baffles, tubes supported by helix baffles, and tubes supported by expanded metal baffles.

3. Apparatus according to claim 2, in which the apparatus further comprises an annular distributor which is in fluid communication with both the inlet for the gaseous hydrocarbon fraction and the shell side of the heat exchanger.

4. Process for cooling and separating a gaseous hydrocarbon fraction, which process comprises the use of an apparatus according to the claim 3 in which process
   a gaseous hydrocarbon fraction is introduced into the heat exchanger,
   a cooling fluid flows through the tubes of the heat exchanger,
   hydrocarbons flow from the heat exchanger to the distillation column via the conduit for guiding hydrocarbons from the heat exchanger to the distillation column.

5. Process according to claim 4, in which process the cooling fluid is water or hydrocarbons.

6. Process according to claim 5, in which process at least 95% by weight of the hydrocarbons of the gaseous hydrocarbon fraction boil below 300° C. at normal pressure.

7. Process according to claim 6, in which process the gaseous hydrocarbon fraction is separated off by distillation and part of the liquid removed from the distillation column is sent back to the distillation column from which the gaseous hydrocarbon fraction originates.

8. Process according to claim 4, in which the gaseous hydrocarbon fraction is obtained from a catalytic cracking unit or a hydrocracking unit.

9. Process according to claim 8, in which the gaseous hydrocarbon fraction contains an amount of liquid, at the most 1% by weight.

10. Apparatus according to claim 1, in which the tubes of the shell-and-tube heat exchanger are supported by expanded metal baffles.

* * * * *